United States Patent
Fleischer et al.

(10) Patent No.: US 7,562,349 B2
(45) Date of Patent: Jul. 14, 2009

(54) VERSION ADAPTATION INTERFACE FOR INTEGRATION OF DIFFERENT VIRTUAL MACHINES

(75) Inventors: Christian Fleischer, Mannheim (DE); Jan Dostert, Nussloch (DE); Frank Kilian, Mannheim (DE)

(73) Assignee: SAP AG, Waldorf (DE)

( * ) Notice: Subject to any disclaimer, the term of this patent is extended or adjusted under 35 U.S.C. 154(b) by 814 days.

(21) Appl. No.: 11/115,022

(22) Filed: Apr. 25, 2005

(65) Prior Publication Data

US 2006/0242634 A1    Oct. 26, 2006

(51) Int. Cl.
    G06F 9/44      (2006.01)
    G06F 9/455     (2006.01)
    G06F 21/00     (2006.01)

(52) U.S. Cl. ............................... 717/122; 718/1; 711/6
(58) Field of Classification Search ................. 717/148; 711/147, 6, 203; 718/1
See application file for complete search history.

(56) References Cited

U.S. PATENT DOCUMENTS

| | | | |
|---|---|---|---|
| 6,066,181 A * | 5/2000 | DeMaster | 717/148 |
| 6,282,702 B1 * | 8/2001 | Ungar | 717/148 |
| 6,289,506 B1 * | 9/2001 | Kwong et al. | 717/148 |
| 6,332,130 B1 * | 12/2001 | Notani et al. | 705/28 |
| 6,442,475 B1 * | 8/2002 | Utsui et al. | 701/200 |
| 6,901,588 B1 * | 5/2005 | Krapf et al. | 717/164 |
| 6,999,607 B2 * | 2/2006 | Kiros et al. | 382/128 |
| 7,162,711 B2 * | 1/2007 | Czajkowski et al. | 717/114 |
| 7,424,710 B1 * | 9/2008 | Nelson et al. | 718/1 |
| 2005/0268290 A1 * | 12/2005 | Cognigni et al. | 717/139 |
| 2006/0143359 A1 * | 6/2006 | Dostert et al. | 711/6 |

* cited by examiner

Primary Examiner—Wei Y Zhen
Assistant Examiner—Chih-Ching Chow
(74) Attorney, Agent, or Firm—Blakely, Sokoloff, Taylor & Zafman LLP

(57) ABSTRACT

A system and method for integrating different virtual machines ("VMs"). A first VM is loaded into an Application Server ("AS") instance. The first VM includes standard features accessible through a standard native interface. A second VM is loaded into the AS instance including the standard features and extended features. The standard features provided by the second VM are accessed by native platform entities through a standardized native interface. The extended features provided by the second VM are accessed by the native platform entities through an adaptation interface.

11 Claims, 7 Drawing Sheets

VERSION ADAPTATION INTERFACE FOR INTEGRATION OF DIFFERENT VIRTUAL MACHINES

TECHNICAL FIELD

This disclosure relates generally to virtual machines, and in particular but not exclusively, relates to an adaptation interface for integrating different versions of JAVA virtual machines.

BACKGROUND INFORMATION

Alone, JAVA applications cannot access libraries and applications in other languages, since the JAVA language does not contain integrated external device support. The JAVA Native Interface ("JNI") is a standardized native programming interface, which enables JAVA code that is interpreted within a JAVA virtual machine ("JVM") to interoperate with applications and libraries written in native languages, such as C, C++, assembly, and the like. The JNI is developed, supported, and fully document by Sun Microsystems, Inc. and defined by the JNI Specification (e.g., JNI Specification, Version 1.1, May 1997).

As illustrated in FIG. 1, the JNI serves as the glue between JAVA applications/methods and native applications/methods, enabling an application to operate in both a native language realm and a JAVA language realm. The JNI provides an interface for native methods or applications to create, inspect, and update JAVA objects, call JAVA methods, catch and throw exceptions from a native method and have these exceptions handled in the JAVA application, load JAVA classes and obtain class information, and perform runtime type checking. Correspondingly, JAVA applications may use the JNI to call C routines, use C++ classes, call assembly routines, and the like. A JAVA programmer may need or want to use the JNI in scenarios where the standard JAVA class libraries do not support the platform-dependent features needed by an application, a library is already written in another language and the JAVA programmer wishes to make it accessible to JAVA code without rewriting the library, or the JAVA programmer may wish to implement a small portion of time-critical code in a lower-level language such as Assembly.

While the JNI is a standardized, uniform, well-thought-out interface, it is a fixed interface, which declares a fixed set of functions for interacting between native and JAVA applications. Accordingly, it does not support the ability to add functions to access proprietary, unique, or specialty enhancements of a proprietary JVM.

SUMMARY OF INVENTION

A system and method for integrating different virtual machines ("VMs") is described. A first VM is loaded into an Application Server ("AS") instance. The first VM includes standard features accessible through a standard native interface. A second VM is loaded into the AS instance including the standard features and extended features. The standard features provided by the second VM are accessed by native platform entities through a standardized native interface. The extended features provided by the second VM are accessed by the native platform entities through an adaptation interface.

In one embodiment, when a first native request is received from native platform entities directed to the first VM to execute one of the extended features not supported by the first VM at the adaptation interface, then the adaptation interface responds to the first native request with an indication that the one of the extended function is not available, if the adaptation interface determines that none of the standard features supported by the first VM is an acceptable alternative to the requested one of the extended features.

In one embodiment, the adaptation interface invokes one of the standard features within the first VM in response to receiving the first native request to execute one of the extended features, if the adaptation interface determines that one of the standard features is an acceptable alternative to the requested one of the extended features.

Embodiments of the invention may include all or some of the above described attributes. The above attributes can be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
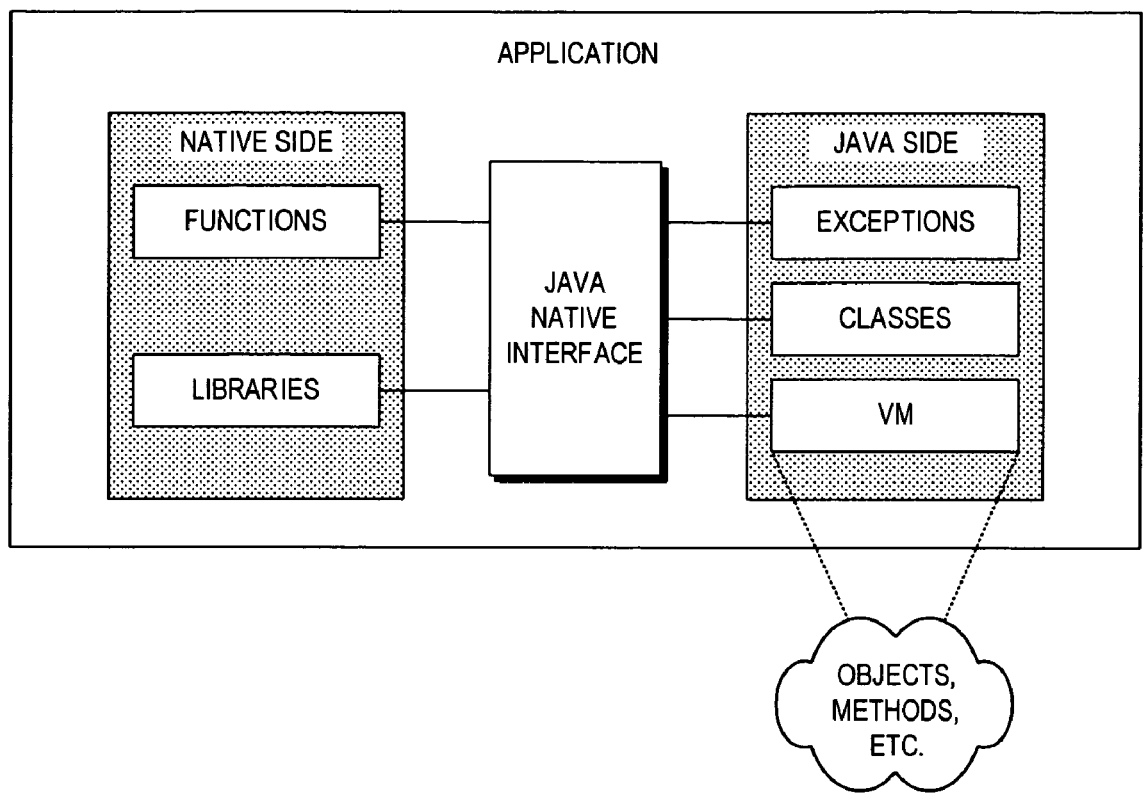
FIG. 1 is a block diagram illustrating how the JAVA Native Interface ties the native language side of an application to the JAVA language side of the application.
Figure 2:
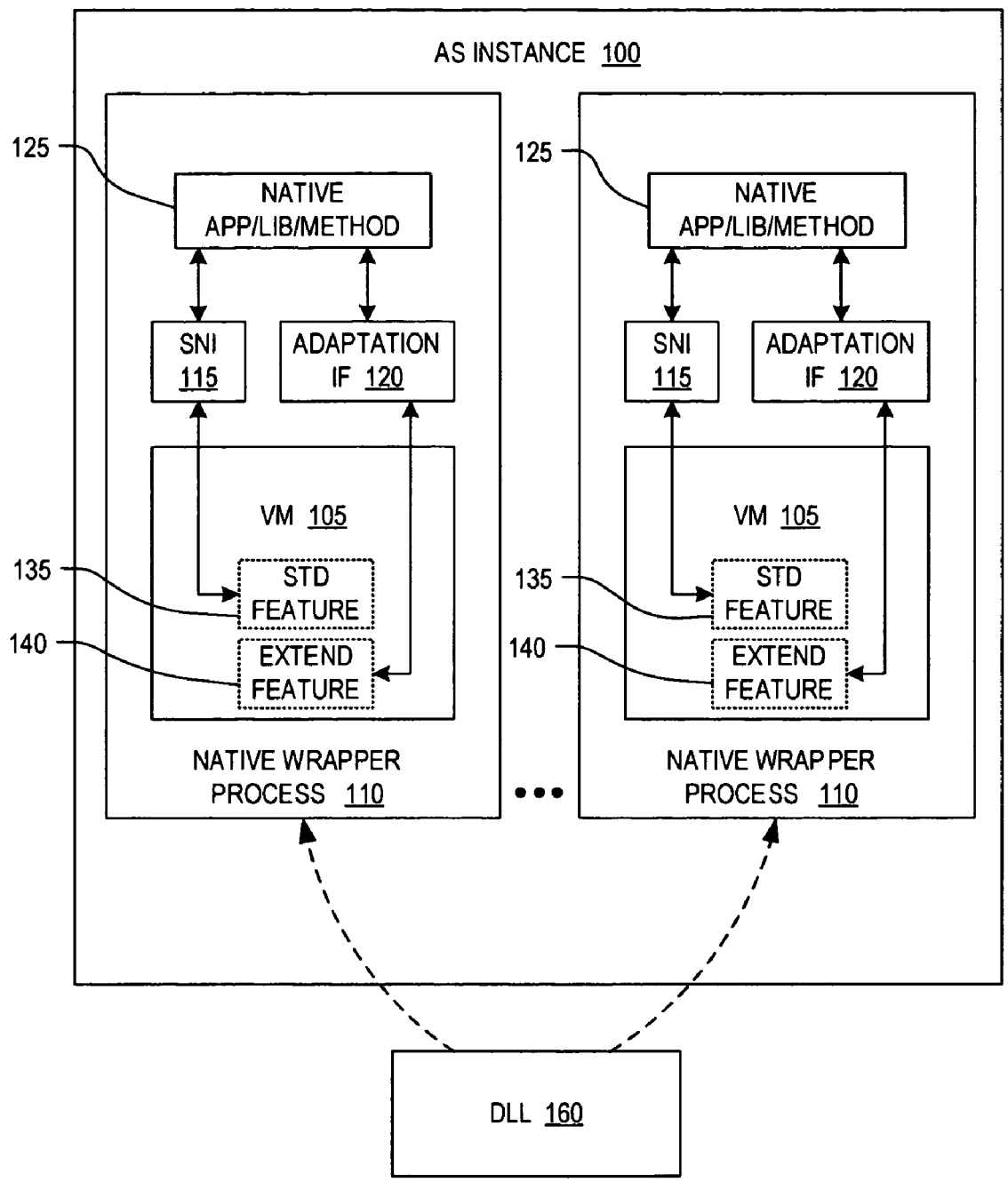
FIG. 2 is a block diagram illustrating an application server ("AS") instance capable of supporting different versions of a virtual machine using an adaptation interface, in accordance with an embodiment of the invention.

FIG. 2 is a block diagram illustrating an application server ("AS") instance 100 capable of supporting different versions of a virtual machine using an adaptation interface 105, in accordance with an embodiment of the invention. The illustrated embodiment of AS instance 100 includes one or more virtual machines ("VMs") 105 each supported by a native wrapper process 110, a standard native interface ("SNI") 115, and an adaptation interface 120.

In one embodiment, VM 105 is a JAVA VM ("JVM"), which interprets JAVA programs by converting them from an intermediate interpreted language (e.g., JAVA bytecode) into a native machine language, which is then executed by the underlying native platform. JAVA programs may be interpreted and executed by VM 105 to provide the business, presentation, and integration logic necessary to process work requests received at AS instance 100 and implement the functionality provided by an application server. Native wrapper process 110 provide the runtime environment for VM 105 to operate. In an embodiment where VM 105 is a JVM compliant with a JAVA 2 Platform, Standard Edition ("J2SE") standard, native wrapper process 110 is often referred to as "JLaunch." Native wrapper process 110 is native machine code (e.g., compiled C++) executed and managed by an operating system ("OS") of the underlying platform. Once native wrapper process 110 is launched, native wrapper process 110 establishes VM 105 within itself. Although two VMs 105 are illustrated within AS instance 100, it should be appreciated that AS instance 100 may include any number of native wrapper processes 110 each supporting a VM 105.

SNI 115 and adaptation interface 120 both provide a native interface for code interpreted within VM 105 to interoperate with native platform entities 125 written in native languages, such as C, C++, assembly, and the like, executed outside of VM 105. Native platform entities 125 may include native applications, native libraries, and native methods written and compiled to execute directly on the native platform executing AS instance 100. Native platform entities 125 may reside within native wrapper process 110 (as illustrated) and execute on the same native platform as AS instance 100. However, embodiments of the invention are not limited to adaptation interface 120 communicating only with native platform entities residing within native wrapper process 100, but rather may be extended to communicate/access other native platform entities external to native wrapper process 110 or even external to AS instance 100, which may reside on a distinct native platform, such as another server or client node communicatively coupled to AS instance 100.

SNI 115 represents a standardized native interface for providing access to standardized features 135 of VMs 105. SNI 115 may represent various known standardized native interfaces such as the JAVA Native Interface ("JNI") developed and supported by Sun Microsystems, Inc. or the Raw Native Interface ("RNI") developed and supported by Microsoft, Inc. In contrast, adaptation interface 120 is an abstraction layer including a variety of interface functions for accessing extended features 140 of VM 105. Adaptation interface 120 imparts AS instances 100 with the ability to support different versions of VM 105 having different available features. For example, VM 105 may be a legacy VM only supporting standard features 135 and not capable of implementing extended features 140 or VM 105 may be an enhanced VM capable of supporting both standard features 135 and extended features 140. Extended features 140 may be proprietary features instrumented into VM 105 and therefore not supported or accessible via SNI 115. Adaptation interface 120 allows software designers to develop proprietary VMs with extended features 140 without waiting for a standardized native interface to mature to support access to extended features 140 or without having to submit the newly developed extended features 140 to a standards committee responsible for maintaining SNI 115.

In one embodiment, adaptation interface 120 provides additional functionality for mapping requests from native platform entities 125 to perform a task requiring operation of a feature not supported by a particular VM 105 to a lesser supported feature of the particular VM 105. In other words, in some embodiments, adaptation interface 120 is capable of accepting a request directed at legacy VM to perform one of enhanced features 140, and either respond with a "feature not supported" indication or execute a "best effort" response by mapping the native request to one of standard features 135.

Although FIG. 2 illustrates one enhanced VM operating within AS instance 110, it should be appreciated that any number of legacy and/or enhanced VMs may operate within AS instance 100. Furthermore, each enhanced VM may include the same set of extended features 140, each include unique extended features 140, each include various different versions of extended features 140, and/or each include any number of extended features 140 (from one to many). Furthermore, although VM 105 is illustrated as including one instance of SNI 115 and one instance of adaptation interface 140, it should be appreciated that various other combinations may be implemented. For example, multiple VMs 105 may either link to a single shared instance of adaptation layer 120, be linked to their own instances of adaptation layer 120, or even link to multiple instances of adaptation layer 120. In one embodiment, each native platform entity 125 links to its own instance of adaptation interface 120 for accessing VM 105. In one embodiment, each native thread links to its own instance of adaptation layer 120.

Extended features 140 may include modified standard features 135, proprietary features, newly developed features not yet supported by SNI 115, or any feature included within VM 105 otherwise not supported by SNI 115. In one embodiment, extended features 140 are JAVA methods coded to execute specialized tasks. In other embodiments, extended features 140 include any function or functionality instrumented into or executable by VM 105 for interoperation with native platform entities 125.

For example, extended features 140 included within an enhanced VM by the assignee of the instant patent application include internal VM heap monitoring methods, VM garbage collecting monitoring methods, internal VM stack dumping methods, and the like. These monitoring features enable multiple VMs 105 to individually collect monitoring data about their internal operation (e.g., heap statistics, garbage collecting statistics, client session information, and the like). The monitoring data may then be published to a shared monitoring memory location external to each of the multiple VMs 105. Adaptation interface 120 may include various monitoring interface functions to facilitate extraction of the monitoring data from within each VM 105 during operation of each VM 105 and publish the monitoring data into the shared monitoring memory maintained within a native platform data structure. Subsequently or in concert, the shared monitoring memory may be accessible by a remote monitoring agent to supervise operation of the multiple VMs 105. In one embodiment, the remote monitoring agent may be a native platform entity external to AS instance 100 which accesses extended features 140, including VM monitoring features described above, via adaptation interface 120.

Figure 3:
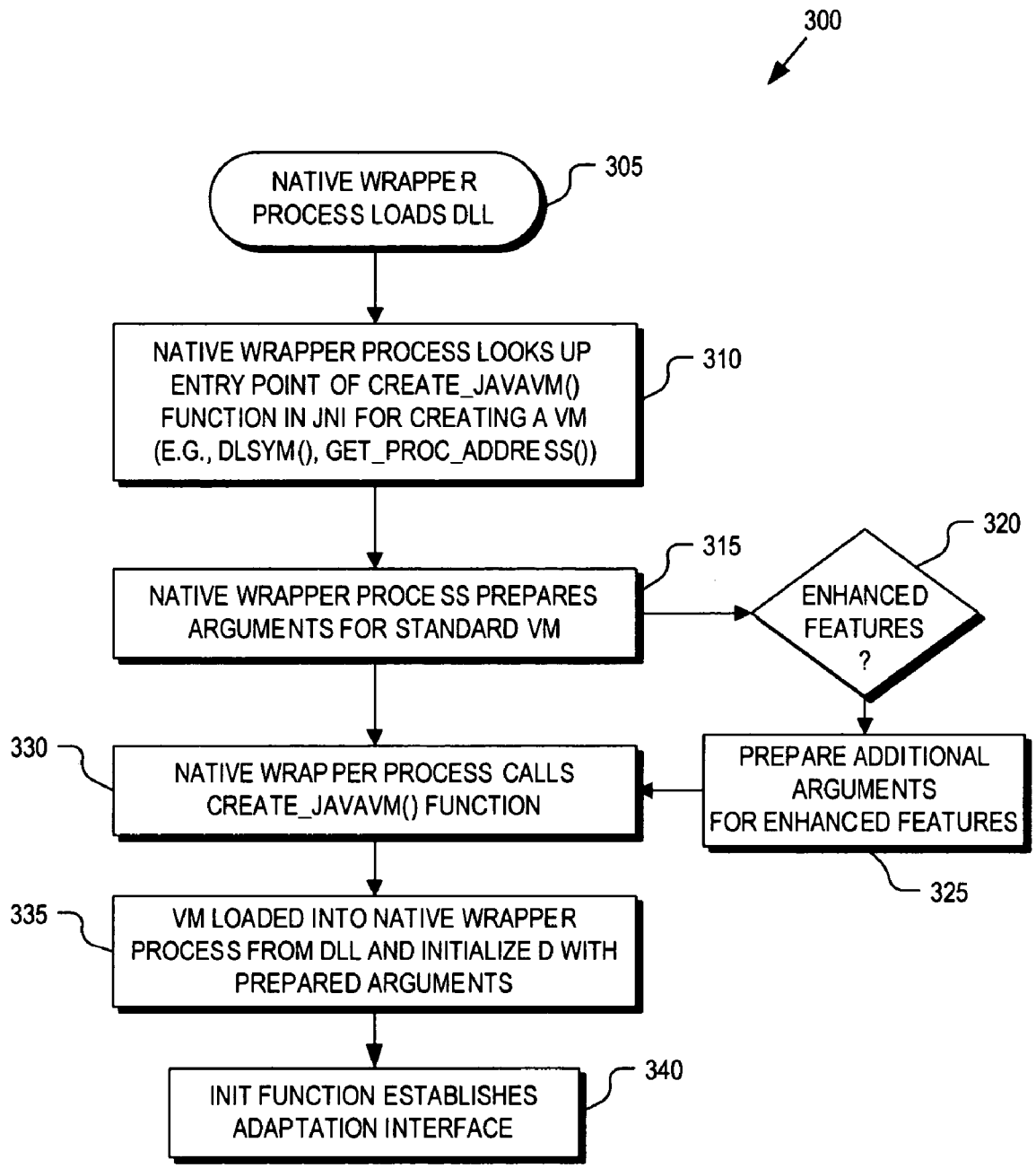
FIG. 3 is a flow chart illustrating a startup process for initializing different versions of a virtual machine within an application server instance, in accordance with an embodiment of the invention.

FIG. 3 is a flow chart illustrating a startup process 300 for initializing different versions of VMs 105 within AS instance 100, in accordance with an embodiment of the invention.

In a process block 305, native wrapper process 110 loads dynamically link library ("DLL") 160 from a non-volatile storage medium (e.g., database, file system, etc.) into system memory of the underlying native platform. DLL 160 is a library which contains the files necessary to setup and operate VM 105. DLL 160 my represent a single library, which contains the code for both legacy VM and enhanced VMs or a plurality of libraries each containing code associated with different VMs 105. Each VM 105 loads DLL 160, or a portion thereof, into its own address space.

Once DLL 160 is loaded into the system memory, native wrapper process 110 will proceed to load VM 105 into itself. In an embodiment where SNI 115 represents the JNI, native wrapper process 110 looks up an entry point of a Create_JavaVM( ) function within the JNI (process block 310). The Create_JavaVM( ) function is part of the invocation application programming interface ("API") of the JNI. The Create- _JavaVM( ) function loads and initializes a JVM and returns a pointer or handle to the JNI interface pointer. In a UNIX based native platform, the entry point to the Create_JavaVM( ) function may be obtain by execution of the DLSym( ) function. In a Windows based native platform, the entry point to the Create_JavaVM( ) function may be obtained by execution of the Get_Proc_Address( ) function.

In a process block 315, native wrapper process 110 prepares arguments for loading and initializing standard features 135. In one embodiment, the arguments prepared by native wrapper process 110 are stored in a "bootstrap.properties" file. In a decision block 320, if native wrapper process 110 is about to load an enhanced VM (decision block 320), as opposed to a legacy VM (the embodiment of FIG. 2 illustrates native wrapper process 110 loading an enhanced VM), then startup process 300 continues to a process block 325. In process block 325, native wrapper process 110 prepares additional arguments for initializing and enabling extended features 140 of the enhanced VM.

In a process block 330, native wrapper process 110 calls the Create_JavaVM( ) function and passes the arguments prepared in process blocks 315 and 325 therewith. In a process block 335, the Create_JavaVM( ) function loads the enhanced VM from DLL 160 into native wrapper process 110 and further initializes the enhanced VM with the prepared arguments. The arguments prepared in process block 315 are used to initialize standard features 135 while the arguments prepared in process block 325 are used to initialized extended features 140.

In one embodiment, once VM 105 is loaded into native wrapper process 110, an INIT function (not illustrated) within native wrapper process 110 is invoked to setup adaptation interface 120 and link adaptation layer 120 with VM 105. Although startup process 300 was illustrated using the JNI to setup a JVM, it should be appreciated that startup process 300 is only intended as an example. Other startup processes may be implemented in connection with embodiments of the invention to setup and initialize other types of VMs using other types of standardized native interfaces.

Figure 4:
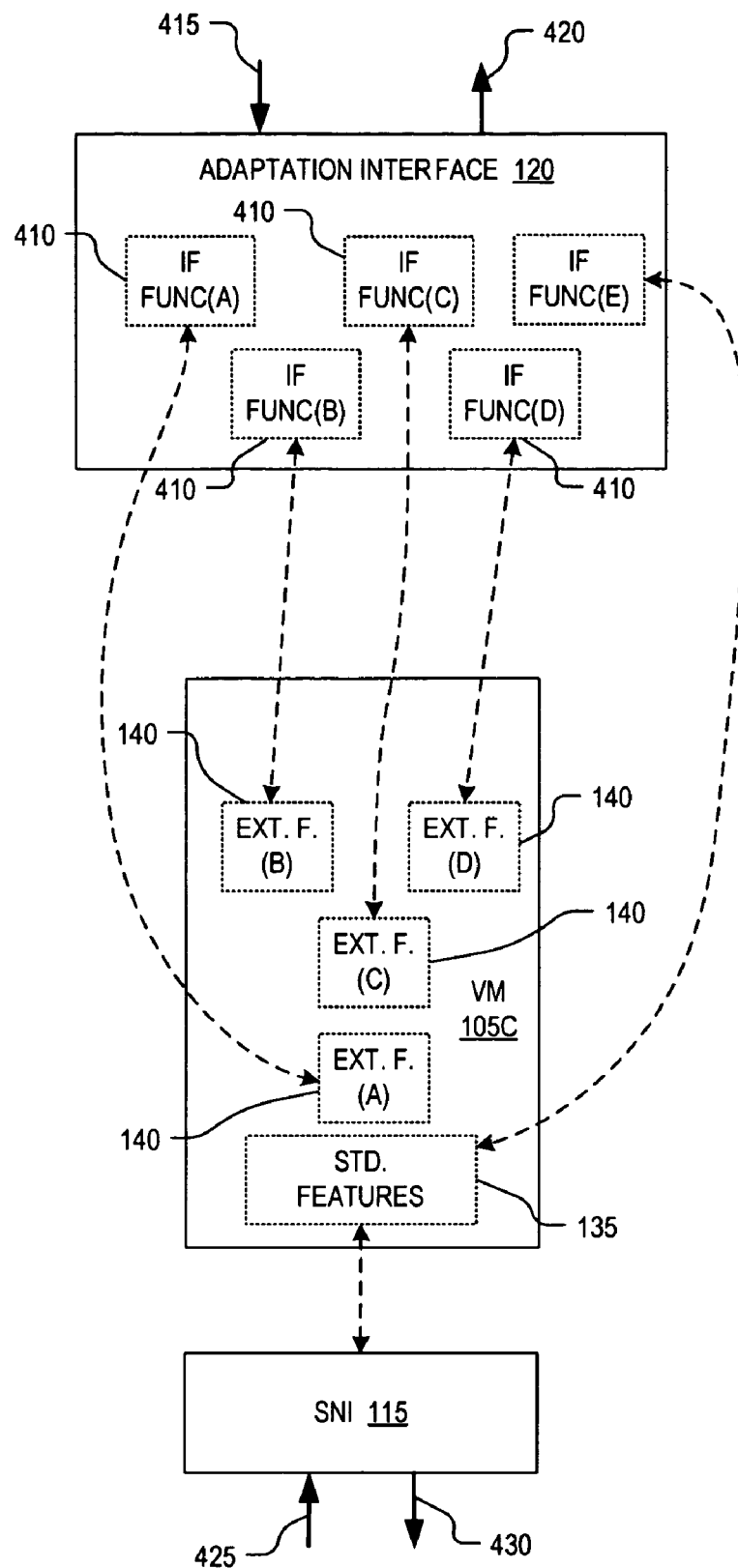
FIG. 4 is a block diagram illustrating an adaptation interface for supporting different versions of a virtual machine, in accordance with an embodiment of the invention.

FIG. 4 is a block diagram illustrating adaptation interface 120 in greater detail for supporting different versions of VMs 105, in accordance with an embodiment of the invention. Although FIG. 4 only illustrates an enhanced VM, the discussion herein is equally applicable to a legacy VM, as well. The illustrated embodiment of adaptation interface 120 includes interface functions 410. Extended features 140 of VM 105 are accessible to native entity platforms 125 via interface functions 410, while standard features 135 are accessible via SNI 115. As illustrated, adaptation layer 120 receives native requests 415 to execute one or more of enhanced features 140 and responses 420 to native requests 415 are forwarded to the requesting one of native platform entities 125 via adaptation layer 120. SNI 115 receives native requests 425 to execute one or more of standard features 135 and responses 430 to native requests 425 are forwarded to the requesting one of native platform entities 125 via SNI 120.

Figure 5:
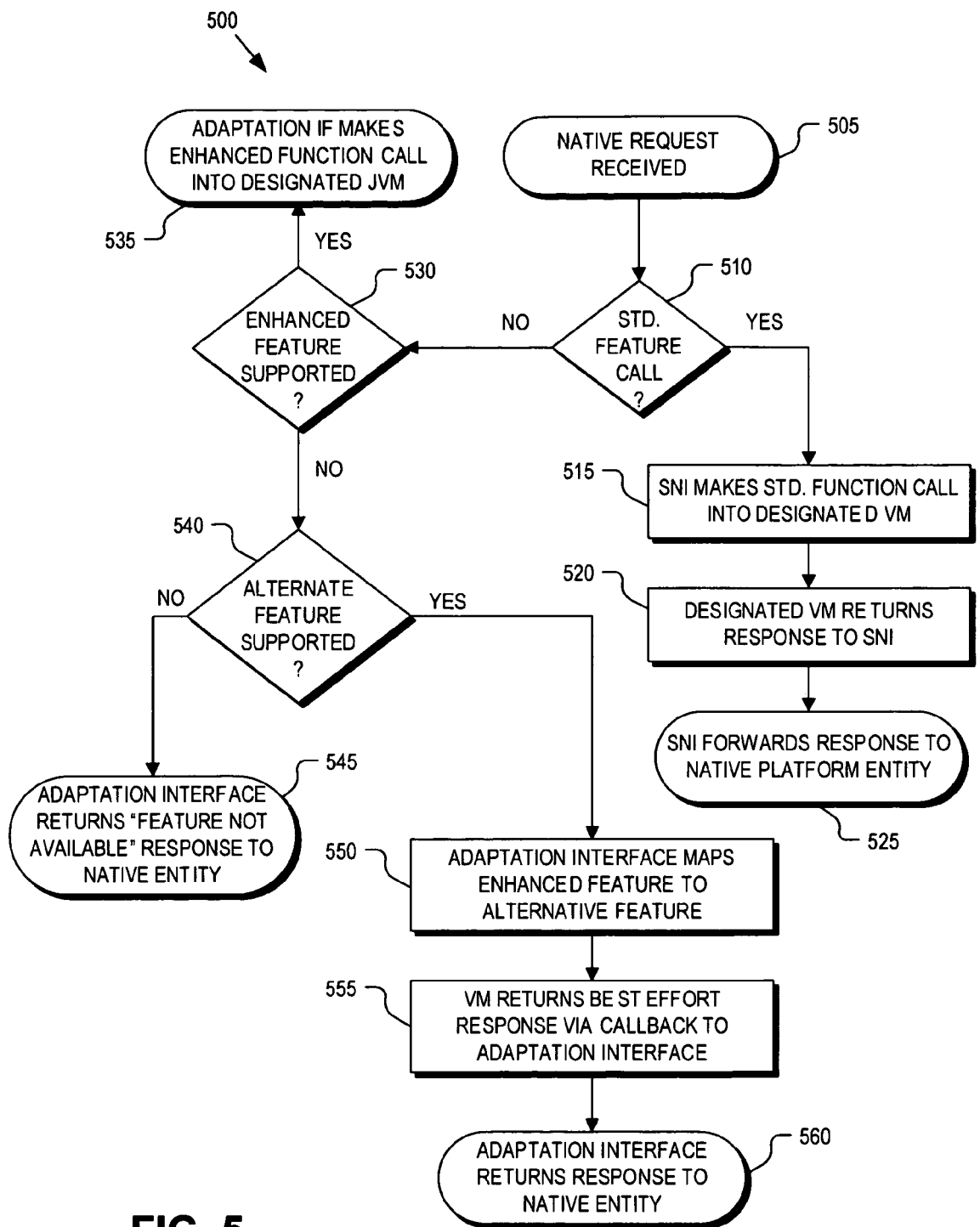
FIG. 5 is a flow chart illustrating a process of supporting access to extended functionality of an enhanced virtual machine using an adaptation interface, in accordance with an embodiment of the invention.

FIG. 5 is a flow chart illustrating a process 500 for providing access to extended features 140 of VM 105 using adaptation interface 120, in accordance with an embodiment of the invention. The illustrated embodiment of process 500 is described with reference to FIG. 4.

In a process block 505, a native request (e.g., one of native requests 415 or 425) is received by AS instance 100. In one embodiment, the native request may be a first request in a native session of interactions between a native platform entity and AS instance 100. In this case, the native request may be assigned to VM 105, among a plurality of VMs loaded within AS instance 100, to implement the native request. In one embodiment, the native request may not be a first request and therefore designate a particular one of VMs 105 with which a native session is already established.

In decision block 510, if the native request is a request that only requires execution of one of standard features 135 (e.g., one of native requests 425), then process 500 continues to a process block 515. In process block 515, SNI 115 makes a function call into the designated one of VMs 105 to execute one or more of standard features 135. In a process block 520, the designated one of VMs 105 returns a response to SNI 115. Finally, in a process block 525, SNI 115 forwards the response (e.g., one of responses 430) to the particular native platform entity 125 that generated the native request.

Returning to decision block 510, if the native request is a request to execute one of extended features 140 (e.g., one of native requests 415), then process 500 continues to a decision block 530. In decision block 530, adaptation interface 120 determines whether VM 105 designated by the native request supports the extended feature 140 requested by the native request. If the designated VM 105 does indeed support the requested extended feature 140, then adaptation interface 120 makes a function call into the designated VM 105 to invoke the requested extended feature 140 (process block 535). Once the invoked extended feature 140 has completed operation, it may callback to adaptation interface 120 with a response, which is then forwarded by adaptation interface 120 as a response 420 to the requesting one of native platform entities 125 or 130. As illustrated in the embodiment of FIG. 4, adaptation interface 120 may include an interface function 410 corresponding to each extended feature 140.

When interoperation with a particular extended feature 140 within VM 105 is desired by a native platform entity, then the native platform entity can access the particular extended feature 140 via its corresponding interface function 410 within adaptation interface 120. Accordingly, adaptation interface 120 enables developers to add new functionality and features to proprietary and/or evolving VMs as desired, and provide native access to these newly added features by addition of a new interface function 410 within adaptation interface 120. Furthermore, adaptation interface 120 enables AS instance 100 to load different versions of VMs at different times. Adaptation interface 120 may even be modified to support different versions of VMs having different extended features 140 simultaneously within AS instance 100. For example, as illustrated in FIG. 4, VM 105 supports extended features (A, B, C, and D) and standard features 135; however, other VMs may be loaded which support other extended features and standard features.

Returning to decision block 530, if the particular extended feature 140 requested is not supported by the particular VM 105 designated by the native request and an alternative standard feature 135 or alternative extended feature 140 is also not supported (decision block 540), then process 500 continues to a process block 545. In process block 545, adaptation interface 120 responds to the native request with an indication that the feature is not supported or the native request failed.

Returning to decision block 530, if the extended feature 140 is not supported, but adaptation interface 120 determines that an acceptable alternative feature is supported by the one of VMs 105 designated by the native request, then process 500 continues to a process block 550. In process block 550, adaptation interface 120 maps the native request to an alternative feature that is supported by the designated VM 105. The alternative feature is invoked by adaptation interface 120 calling into the designated VM 105 and a "best effort" response returned (process block 555). As described above, adaptation interface 120 forwards the best effort response to the requesting one of native platform entities 125 (process block 560). Accordingly, in one embodiment, adaptation interface 120 includes logic to receive a native request, determine whether the native request is supported by the designated VM 105, and if not, determine whether an alternative feature capable of at least partially responding to the native request is supported by the designated VM 105, and finally diverting the native request to be serviced by the alternative feature.

In one embodiment, a best effort response may include mapping a native request to perform an unsupported extended feature 140 to a supported standard feature 135. For example, FIG. 4 illustrates that VM 105 does not support extended feature (E); however, interface function (E) of adaptation interface 120 may determine that one of standard features 135 is an adequate, though perhaps lesser, feature capable of generating at least a partial response to the native request. In one embodiment, a best effort response may include mapping a native request to perform an unsupported extended feature 140 to another supported extended feature 140. In one embodiment, a best effort response may include mapping a native request to perform an unsupported extended feature 140 to multiple standard features 135 or to a combination of supported standard and extended features 135 and 140.

Figure 6:
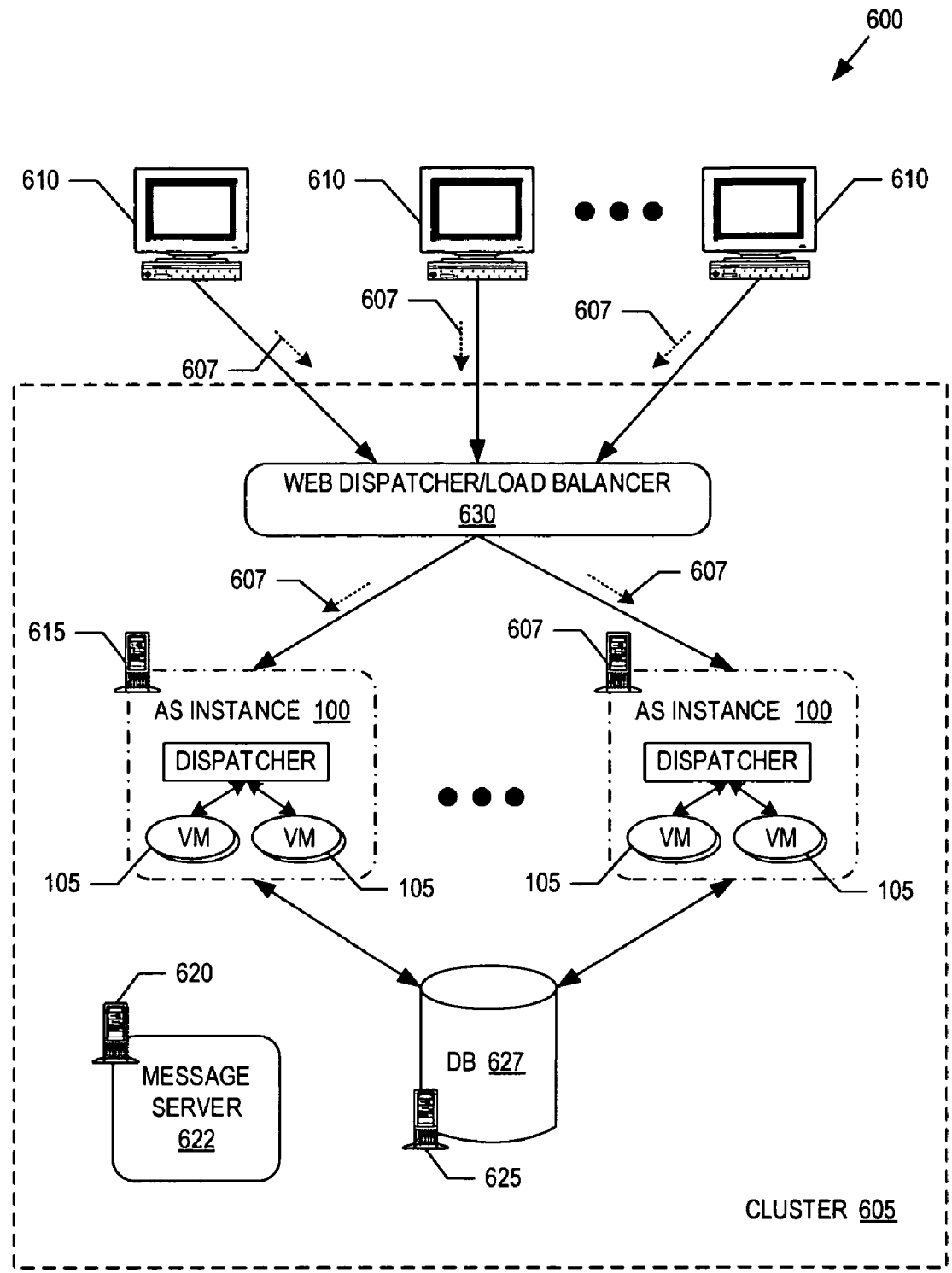
FIG. 6 is a block diagram illustrating a demonstrative enterprise environment for implementing embodiments of the invention.

FIG. 6 is a block diagram illustrating a demonstrative enterprise environment 600 for implementing embodiments of the invention. The illustrated embodiment of enterprise environment 600 includes a cluster 605 coupled to service work requests 607 from client nodes 610. Cluster 605 may include one or more server nodes 615 each supporting one or more AS instances 100, a message server node 620 supporting a message server 622, a database node 625 supporting a database 627, and a web dispatcher 630.

AS instances 100 may be web application servers, such as Web AS by SAP, .NET by Microsoft, or the like. Each AS instance 100 may include one or more VMs 105 to execute JAVA programs and service work requests 607. It should be appreciated that various components of AS instances 100 have been excluded from FIG. 6 for the sake of clarity and so as not to obscure the invention. In one embodiment, VMs 105 may be compliant with the J2SE standard. In one embodiment, VMs 105 may be compliant with the .NET framework from Microsoft. Each AS instance 100 may even include VMs 105 compliant with both the J2SE standard and the .NET framework.

Web dispatcher 630 implements a load-balancing mechanism distributing work requests 607 from client nodes 610 among server nodes 615 within cluster 605. For example, web dispatcher 630 may implement a round-robin load-balancing mechanism or the like. Web dispatcher 630 may be one of server nodes 615 having the task of dispatching work requests 607 among server nodes 615 of cluster 605 or a stand alone hardware node. Work requests 607 are processed by server nodes 615 and may subsequently be provided to database node 625. Database node 625 offers up the requested data to server nodes 615, which in turn process and format the results for display on client nodes 610. Each AS instance 100 may further include its own dispatcher mechanism to distribute work requests 607 assigned to it among its individual VMs 105.

JAVA programs executed by VMs 105 within AS instances 100 may collectively provide the logic for implementing various sub-layers (e.g., business layer, integration layer, presentation layer, etc.) of AS instances 100. For example, the JAVA programs may be servlets providing server-side logic to generate graphical user interfaces ("GUIs") on clients nodes 610 and may further include JavaServer Page ("JSP") extensions for providing dynamic content within the GUI. The JAVA programs may further include business applications providing the business logic of an Enterprise JavaBean ("EJB"), and on client nodes 610 may be applets providing client side logic, and the like.

As discussed above, one or more native entities 125 may reside within each AS instance 100 within a file system or the like on each server node 615. Some Native entities may reside external to each AS instance 100 on each server node 615, database node 625, or even on client nodes 610, web dispatcher 630, or message server 622. Before loading DLL 160 into system memory of each server node 615, DLL 160 may be distributed having a copy saved on each server node 615 or centrally loaded on database node 625.

Figure 7:
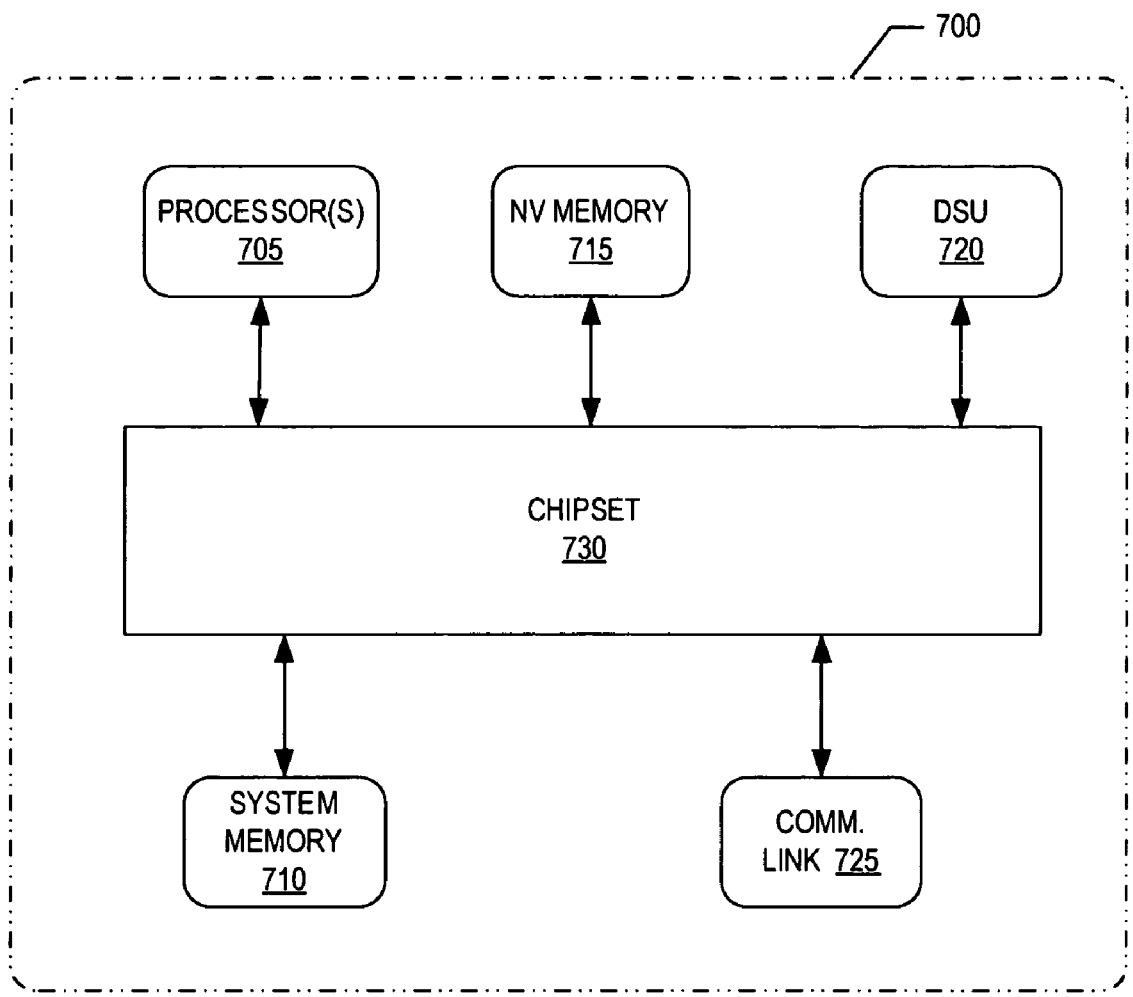
FIG. 7 illustrates a demonstrative processing system for implementing embodiments of the invention.

FIG. 7 is a block diagram illustrating a demonstrative processing system 700 for executing any of AS instance 100 including adaptation interface 120 and processes 300 and 500, or implementing any of client nodes 610, server nodes 615, message server node 620, or database node 625. The illustrated embodiment of processing system 700 includes one or more processors (or central processing units) 705, system memory 710, nonvolatile ("NV") memory 715, a DSU 720, a communication link 725, and a chipset 730. The illustrated processing system 700 may represent any computing system including a desktop computer, a notebook computer, a workstation, a handheld computer, a server, a blade server, or the like.

The elements of processing system 700 are interconnected as follows. Processor(s) 705 is communicatively coupled to system memory 710, NV memory 715, DSU 720, and communication link 725, via chipset 730 to send and to receive instructions or data thereto/therefrom. In one embodiment, NV memory 715 is a flash memory device. In other embodiments, NV memory 715 includes any one of read only memory ("ROM"), programmable ROM, erasable programmable ROM, electrically erasable programmable ROM, or the like. In one embodiment, system memory 710 includes random access memory ("RAM"), such as dynamic RAM ("DRAM"), synchronous DRAM, ("SDRAM"), double data rate SDRAM ("DDR SDRAM") static RAM ("SRAM"), and the like. DSU 720 represents any storage device for software data, applications, and/or operating systems, but will most typically be a nonvolatile storage device. DSU 720 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 720 is illustrated as internal to processing system 700, DSU 720 may be externally coupled to processing system 700. Communication link 725 may couple processing system 700 to a network such that processing system 700 may communicate over the network with one or more other computers. Communication link 725 may include a modem, an Ethernet card, a Gigabit Ethernet card, Universal Serial Bus ("USB") port, a wireless network interface card, a fiber optic interface, or the like.

It should be appreciated that various other elements of processing system 700 have been excluded from FIG. 7 and this discussion for the purposes of clarity. For example, processing system 700 may further include a graphics card, additional DSUs, other persistent data storage devices (e.g., tape drive), and the like. Chipset 730 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 730. Correspondingly, processing system 700 may operate without one or more of the elements illustrated. For example, processing system 700 need not include DSU 720.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Processes 300 and 500 explained above are described in terms of computer software and hardware. The techniques described may constitute machine-executable instructions embodied within a machine (e.g., computer) readable medium, that when executed by a machine will cause the machine to perform the operations described. Additionally, processes 300 and 500 may be embodied within hardware, such as an application specific integrated circuit ("ASIC") or the like. The order in which some or all of the process blocks appear in processes 300 and 500 should not be deemed limiting. Rather, one of ordinary skill in the art having the benefit of the present disclosure will understand that some of the process blocks may be executed in a variety of orders not illustrated.

The above description of illustrated embodiments of the invention, including what is described in the Abstract, is not intended to be exhaustive or to limit the invention to the precise forms disclosed. In some examples above, well-known structures, materials, or operations are not shown or described in detail to avoid obscuring certain aspects. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
loading a first and second virtual machine ("VM") within an application server ("AS") instance contained on a device, the device to include an adaptation interface, the first VM providing standard features and the second VM providing the standard features and extended features not supported by the first VM;
providing access for native platform entities to the standard features and extended features of the VMs contained on the device, wherein
the extended features are accessible by native platform entities via interface functions contained in the adaptation interface, the interface functions to provide interoperability between the native platform entities and the corresponding one of the extended features within the second VM, and
the standard features are accessible by native platform entities through standardized native interfaces; and
responding to a native request from a native platform entity to execute an extended feature not provided by the first VM at the adaptation interface by
determining whether one of the standard features is an acceptable alternative to the requested extended feature, wherein
in response to determining that none of the standard features of the first VM is an acceptable alternative to the requested extended feature, responding to the native request with an indication that the one of the extended features is not available, and
in response to determining that one of the standard features is an acceptable alternative to the requested one of the extended features, invoking one of the standard features within the first VM.

2. The method of claim 1, wherein invoking the one of the standard features within the first VM in response to receiving the native request to execute one of the extended features, comprises:
mapping the native request directed to the first VM to execute one of the extended features to the one of the standard features; and
responding to the native request to execute one of the extended features with a best effort response.

3. The method of claim 1, wherein the standardized native interfaces compatible with a JAVA Native Interface ("JNI") specification.

4. The method of claim 1, wherein accessing tile extended features of the second plurality of VMs by the native platform entities through the adaptation interface comprises:
receiving an additional native request from the native platform entities at the adaptation interface to execute the extended features of the second VM;
calling into the second VM containing the extended feature from the adaptation interface to invoke the extended features;
calling the adaptation interface back from within the VM containing the extended feature to pass responses to the additional native request to the adaptation interface; and
forwarding the responses from the adaptation interface to the native platform entities.

5. The method of claim 4, wherein the extended features include one or more of an VM internal heap monitoring function, a VM garbage collecting monitoring function, and an internal VM stack dumping function.

6. An application server ("AS") system comprising:
A memory system;
A processing system including a processor coupled to the memory system;
a first virtual machine ("VM") loaded in the memory system providing standard features, the first VM to execute via the processing system;
a second VM loaded into the memory system providing the standard features and extended features not supported by the first VM, the second VM to execute via the processing system, wherein each of the extended features is accessible via an interface function, the interface functions to provide interoperability between the native platform entities and the corresponding one of the extended features within the second VM;
first and second standardized native interfaces ("SNI") linked to enable native platform entities to interoperate with the standard features of the first and second VMs, respectively; and
an adaptation interface to include the interface functions connected to the extended features provided by the second VM and linked to enable the native platform entities to interoperate with the extended features of the second VM, not accessible through the SNI, the adaptation interface configured to receive a native request directed to the first VM from one of the native platform entities to execute one of the extended features provided by the second VM, respond to the native request with an indication that the requested one of the extended features is not available, if the adaptation interface determines that none of the standard features supported by the first VM is an acceptable alternative to the requested one of the extended features, and invoke one of the standard features within the first VM in response to receiving the native request to execute one of the extended features, if the interface function determines that one of the standard features is an acceptable alternative to the requested one of the extended features.

7. The AS system of claim 6, wherein the first VM comprises a legacy VM and the second VM comprises an enhanced proprietary VM.

8. The AS system of claim 6, wherein the first and second standardized native interfaces are compatible with a JAVA Native Interface ("JNI") specification.

9. An article of manufacture comprising machine computer-readable storage medium that provides instructions that, if executed by a machine processor, will cause the machine processor to perform operations comprising:

loading a first and second virtual machine ("VM") within an application server ("AS") instance contained on a device, the device to include an adaptation interface, the first VM providing standard features and the second VM providing the standard features and extended features not supported by the first VM;

providing access for native platform entities to the standard features and extended features of the VMs contained on the device, wherein the extended features are accessible by native platform entities via interface functions contained in the adaptation interface, the interface functions to provide interoperability between the native platform entities and the corresponding one of the extended features within the second VM, and the standard features are accessible by native platform entities through standardized native interfaces; and responding to a native request from a native platform entity to execute an extended feature not provided by the first VM at the adaptation interface by determining whether one of the standard features is an acceptable alternative to the requested extended feature, wherein in response to determining that none of the standard features of the VM is an acceptable alternative to the requested extended feature, responding to the native request with an indication that the one of the extended features is not available, and in response to determining that one of the standard features is an acceptable alternative to the requested one of the extended features, invoking one of the standard features within the first VM.

10. The article of manufacture of claim 9, wherein the standardized native interfaces compatible with a JAVA Native Interface ("JNI") specification.

11. The article of manufacture of claim 9, wherein accessing the extended features of the plurality of second VMs by the native platform entities through the adaptation interface comprises:

receiving an additional native request from the native platform entities at the adaptation interface to execute the extended features of the VMs;

calling into the second VM containing the extended feature from the adaptation interface to invoke the extended features;

calling the adaptation interface back from within the VM containing the extended feature to pass responses to the additional native request to the adaptation interface; and forwarding the responses from the adaptation interface to the platform native platform entities.

* * * * *